United States Patent
Fu et al.

(10) Patent No.: US 9,794,834 B2
(45) Date of Patent: Oct. 17, 2017

(54) INFORMATION TRANSMISSION METHOD AND DEVICE THEREOF

(71) Applicant: China Academy of Telecommunications Technology, Beijing (CN)

(72) Inventors: Zhe Fu, Beijing (CN); Jiamin Liu, Beijing (CN); Yumin Wu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 141 days.

(21) Appl. No.: 14/419,859

(22) PCT Filed: Jun. 14, 2013

(86) PCT No.: PCT/CN2013/077231
§ 371 (c)(1),
(2) Date: Feb. 5, 2015

(87) PCT Pub. No.: WO2014/023128
PCT Pub. Date: Feb. 13, 2014

(65) Prior Publication Data
US 2015/0208288 A1    Jul. 23, 2015

(30) Foreign Application Priority Data
Aug. 6, 2012   (CN) .......................... 2012 1 0276738

(51) Int. Cl.
*H04W 36/00*   (2009.01)
*H04W 8/22*   (2009.01)

(52) U.S. Cl.
CPC ... *H04W 36/0033* (2013.01); *H04W 36/0055* (2013.01); *H04W 36/0083* (2013.01); *H04W 8/22* (2013.01)

(58) Field of Classification Search
CPC ... H04W 8/22; H04W 36/08; H04W 36/0016; H04W 36/0033; H04W 36/0055;
(Continued)

(56) References Cited

U.S. PATENT DOCUMENTS

| 2011/0183672 A1 | 7/2011 | Jeong et al. |
| 2013/0194941 A1* | 8/2013 | Lu ..................... H04W 52/0254 370/252 |
| 2015/0172969 A1* | 6/2015 | Sebire ............... H04W 36/0016 370/331 |

FOREIGN PATENT DOCUMENTS

| CN | 101043711 | 9/2007 |
| CN | 102238659 | 11/2011 |
| JP | 2000-224103 | 8/2000 |

OTHER PUBLICATIONS

Extended European Search Report for EP 13828483.1 mailed Jul. 30, 2015.
(Continued)

*Primary Examiner* — Pao Sinkantarakorn
*Assistant Examiner* — Kabir Jahangir
(74) *Attorney, Agent, or Firm* — Meng H. Pua; Foley & Lardner LLP

(57) ABSTRACT

Disclosed are an information transmission method and a device thereof. The method comprises: after determining that a UE needs to conduct base station handover, a source base station which supports an eDDA auxiliary information reporting and processing capability querying whether a candidate target base station supports the eDDA auxiliary information reporting and processing capability or not; and if the source base station queries that the candidate target base station supports the eDDA auxiliary information reporting and processing capability or fails to query whether the candidate target base station supports the eDDA auxiliary information reporting and processing capability or not, or
(Continued)

when the source base station does not query whether the candidate target base station supports the eDDA auxiliary information reporting and processing capability or not, the source base station sending to the candidate target base station the eDDA auxiliary information about the UE, to enable the candidate target base station which supports the eDDA auxiliary information reporting and processing capability to conduct radio resource parameter configuration on the UE based on the received eDDA auxiliary information about the UE. By using the embodiments of the present invention, during the process of handover a UE from a source base station to a target base station, the efficiency for the target base station which supports an eDDA auxiliary information reporting and processing capability to acquire eDDA auxiliary information about the UE is improved, and the air interface signalling overhead is reduced.

18 Claims, 5 Drawing Sheets

(58) Field of Classification Search
CPC ......... H04W 36/0072; H04W 36/0077; H04W 36/0083; H04W 36/16; H04W 36/24
See application file for complete search history.

(56) References Cited

OTHER PUBLICATIONS

Nokia Siemens Networks et al: "Assistance Information Framework", 3GPP Draft; R2-123362 Assistance Information Framework, 3rd Generation Partnership Project (3GPP), Mobile Competence Centre ; 650, Route Des Lucioles , F-06921 Sophia-Antipolis Cedex; France, vol. RAN WG2, no. Qingdao, China; Aug. 13, 2012-Aug. 17, 2012 (Aug. 5, 2012), XP050665123, Retrieved from the Internet: URL:http://www.3gpp.org/ftp/tsg_ran/WG2_RL2/TSGR2_79/Docs/ [retrieved on Aug. 5, 2012] * Section 2. Common Framework *.

Mediatek: "JDC Information Forwarding at Handover", 3GPP Draft; R2-121349 IDC Information Forwarding at Handover, 3rd Generation Partnership Project (3GPP), Mobile Competence Centre; 650, Route Des Lucioles , F-06921 Sophia-Antipolis Cedex ; France, vol. RAN WG2, no. Jeju, Korea; Mar. 26, 2012-Mar. 30, 2012, Mar. 20, 2012 (Mar. 20, 2012), XP050606268, [retrieved on Mar. 20, 2012] * Section 2. Discussion, Section 3. Conclusion *.

Nokia Corporation et al: 'Stage 2 CR on eDDA UE assistance information', 3GPP Draft; 36300_CR0450_(REL-11)_R2-123109 Stage 2 CR on EDDA UE Assistance-Information, $3^{rd}$ Generation Partnership Project (3GPP), Mobile Competence Centre , 650, Route Des Lucioles ; F-06921 Sophia-Antipolis Cedex ; France, vol. RAN WG2, no. Prague, Czech Republic; May 21, 2012-May 25, 2012, May 25, 2012 (May 25, 2012), XP050607543, [retrieved on May 25, 2012] * the whole document *.

International Search Report for PCT/CN2013/077231 mailed Sep. 26, 2013.

Catt, "Acquisition of UE Interest Information when handover", 3GPP TSG RAN WG2 Meeting #78, R2-122163, May 25, 2012.

Nokia Siemens Networks, "The MBMS SAI information of neighbouring cells", 3GPP TSG-RAN WG3 Meeting #75bis, R3-120612, Mar. 30, 2012.

"Assistance Information Framework," Nokia Siemens Networks, Nokia Corporation, 3GPP TSG-RAN WG2 Meeting #78, Prague, Czech Republic, May 21-25, 2012, R2-122108.

* cited by examiner ial Application No. PCT/CN2013/077231, filed on 14 Jun. 2013, designating the United States, and claiming the benefit of Chinese Patent Application No. 201210276738.1, filed with the Chinese Patent Office on Aug. 6, 2012 and entitled "Information transmission method and device thereof", which is hereby incorporated by reference in its entirety.

INFORMATION TRANSMISSION METHOD AND DEVICE THEREOF

This application is a US National Stage of International Application No. PCT/CN2013/077231, filed on 14 Jun. 2013, designating the United States, and claiming the benefit of Chinese Patent Application No. 201210276738.1, filed with the Chinese Patent Office on Aug. 6, 2012 and entitled "Information transmission method and device thereof", which is hereby incorporated by reference in its entirety.

FIELD OF THE INVENTION

The present invention relates to the field of wireless communications and particularly to a method and device for allocating a resource.

BACKGROUND OF THE INVENTION

There are constantly growing demands of people for types of services which can be supported by terminal device along with the popularization of smart phones, and in view of this, a new work item has been introduced by the 3$^{rd}$ Generation Partnership Project (3GPP) under the discussion of the Long Tem Evolution-Advanced (LTE-A) Release 11 (Rel-11), i.e., the Enhancements for Diverse Data Applications (eDDA), which is intended to enhance the existing technologies in the LTE-A system, thereby to improve the performance of the LTE-A system, to save signaling/resource overheads, to guarantee experiences of subscribers and power saving of the terminal, and other objects, in view of types of services which can be supported nowadays by the terminal devices tending to be diversified. This technology is applicable to an Evolved Universal Terrestrial Radio Access Network (E-UTRAN) and a User Equipment (UE). In order to attain these objects, both the UE and network sides need to obtain state information of each other.

A background service and an instant message (IM) service are two types of services at the highest priority investigated in the eDDA scenario. These two services have gained popular attention among various enterprises in real applications due to their low amount of traffic and variable burst data packets. Particularly the background service typically refers to a service in an inactive state has some low amount of data traffic to maintain a connection, and the IM service typically refers to a service with small but temporarily burst/frequent data packets including mobile QQ, Fetion, etc. In order to enable the network side to obtain a service characteristic and know a preference of a subscriber (for example, whether the UE prefers a power-saving mode or another mode with a better experience of the subscriber at that time) instantly and effectively, the introduction of a mechanism for reporting eDDA assistance information at the UE side has been suggested at the radio access network Layer 2 (RAN 2). eDDA assistance information is reported at the UE side primarily for the purpose of assisting the network side in configuring the UE with a more appropriate radio resource parameter including a Discontinuous Reception (DRX) parameter or another Radio Resource Control (RRC) parameter. When there is a change to the state of the UE (e.g., a change to its preference), the UE can report the changed information again to the network side. The network side will issue an indicator to the UE to indicate whether eDDA assistance information reporting is supported in the current cell. The UE can report eDDA assistance information to an evolved Node B (eNB) only if an indicator for allowing the reporting is detected.

In the existing application scenario, when UE moves in communication from a coverage area of one base station to a coverage of another base station or there is a drop in quality of communication due to external interference, the UE has to be handed over from the current communication link to an idle communication link of another cell, or the UE has to be handed over from the current communication link to a communication link of another cell for the purpose of load balancing. In this case, there has been absent in the prior art a solution to obtaining by the target base station the eDDA assistance information of the UE.

SUMMARY OF THE INVENTION

Embodiments of the invention provide a method and device for transmitting information so that when a UE is handed over from a source base station to a target base station, the target base station supporting an eDDA assistance information reporting and processing capability receives eDDA assistance information of the UE transmitted by the source base station and further configures the UE with radio resource based upon the received eDDA assistance information.

In order to attain the object above, an embodiment of the invention provides a method for transmitting information, the method including:

when a source base station supporting an Enhancements for Diverse Data Applications (eDDA) assistance information reporting and processing capability determines that a User Equipment (UE) needs to be handed over between base stations, inquiring about whether a candidate target base station supports the eDDA assistance information reporting and processing capability; and if the source base station determines as a result of an inquiry that the candidate target base station supports the eDDA assistance information reporting and processing capability, or fails to inquire about whether the candidate target base station supports the eDDA assistance information reporting and processing capability, or the source base station does not inquire about whether the candidate target base station supports the eDDA assistance information reporting and processing capability, then transmitting, by the source base station, eDDA assistance information of the UE to the candidate target base station so that the candidate target base station supporting the eDDA assistance information reporting and processing capability configures the UE with a radio resource parameter based upon the received eDDA assistance information of the UE.

An embodiment of the invention further provides a base station including:

an inquiring module configured, when the base station supports an Enhancements for Diverse Data Applications (eDDA) assistance information reporting and processing capability and the base station determines that a User Equipment (UE) needs to be handed over between base stations, to inquire about whether candidate target base station supports the eDDA assistance information reporting and processing capability; and a transmitting module configured, when the inquiring module determines as a result of an inquiry that the candidate target base station supports the eDDA assistance information reporting and processing capability, or fails to inquire about whether the candidate target base station supports the eDDA assistance information reporting and processing capability, or the inquiring module does not inquire about whether the candidate target base station supports the eDDA assistance information reporting and processing capability, to transmit eDDA assistance information of the UE to the candidate target base station so that the candidate target base station supporting the eDDA assistance information reporting and processing capability configures the UE with a radio resource parameter based upon the received eDDA assistance information of the UE.

In the embodiments of the invention, when a source base station supporting an assistance information reporting and processing capability determines that a UE needs to be handed over between base stations, the source base station inquires about whether candidate target base station supports the eDDA assistance information reporting and processing capability; and when the source base station determines as a result of an inquiry that the candidate target base station supports the eDDA assistance information reporting and processing capability, or fails to inquire about whether the candidate target base station supports the eDDA assistance information reporting and processing capability, or the source base station does not inquire about whether the candidate target base station supports the eDDA assistance information reporting and processing capability, the source base station transmits eDDA assistance information of the UE to the candidate target base station so that the candidate target base station supporting the eDDA assistance information reporting and processing capability can configure the UE with a radio resource parameter based upon the received eDDA assistance information of the UE. With the technical solutions according to the embodiments of the invention, the UE can be handed over from the source base station to the candidate target base station at an improvement in efficiency with which the candidate target base station obtain the eDDA assistance information of the UE, and at a lowered air interface signaling overhead.

DETAILED DESCRIPTION OF THE EMBODIMENTS

Figure 1:
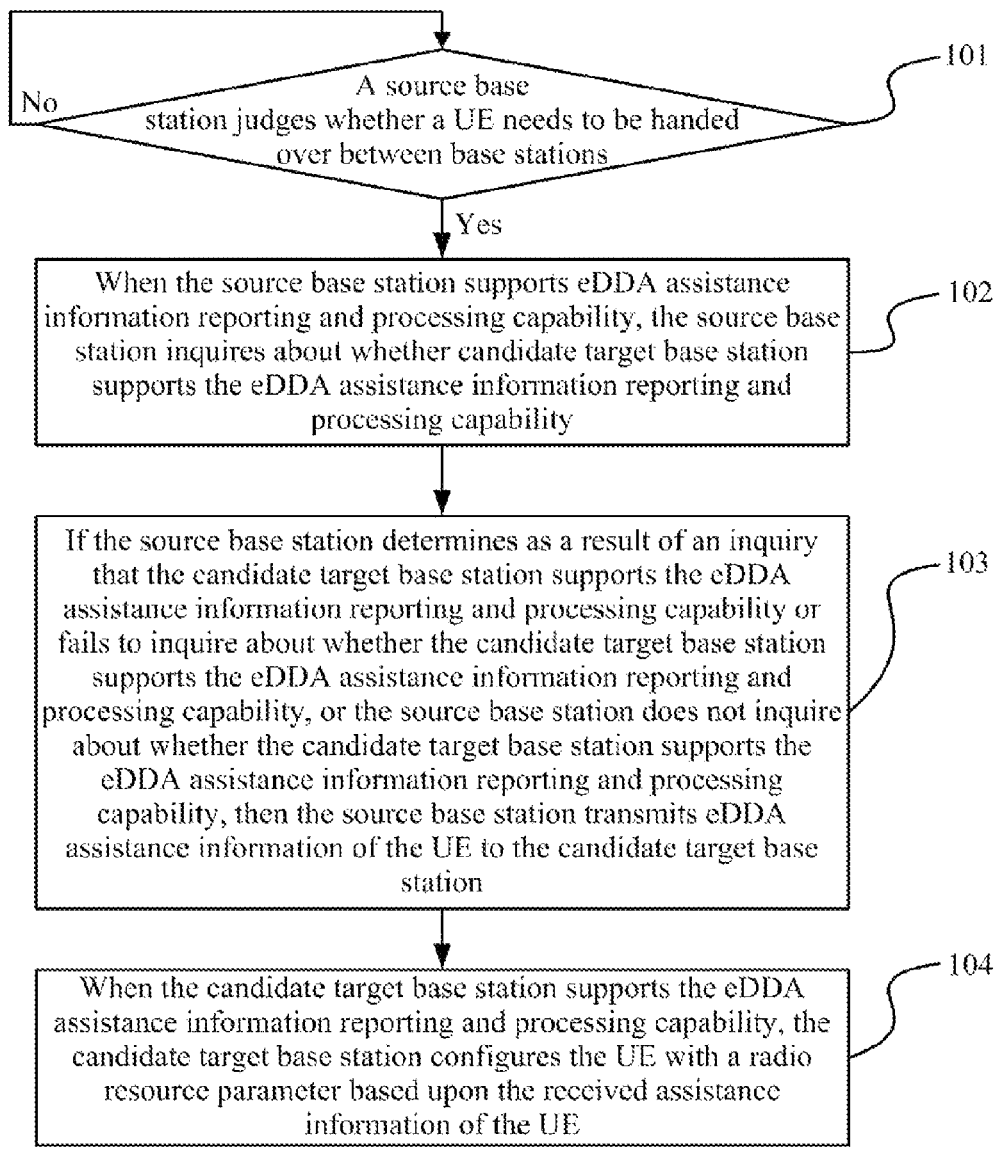
FIG. 1 illustrates a schematic flow chart of a method for transmitting information according to a first embodiment of the invention.

Since there has been absent in the prior art a solution to how a target base station obtains eDDA assistance information of a UE when the UE is handed over from a source base station to the target base station, embodiments of the invention provide a method for transmitting information. In this method, after a source base station, particularly a source base station supporting an eDDA assistance information reporting and processing capability, determines a UE to be handed over between base stations, the source base station inquires about whether candidate target base station supports the eDDA assistance information reporting and processing capability; and if the source base station determines as a result of an inquiry that the target base station supports the eDDA assistance information reporting and processing capability or fails to inquire about whether the candidate target base station supports the eDDA assistance information reporting and processing capability, or the source base station does not inquire about whether the candidate target base station supports the eDDA assistance information reporting and processing capability, then the source base station transmits eDDA assistance information of the UE to the candidate target base station so that the candidate target base station supporting the eDDA assistance information reporting and processing capability configure the UE with a radio resource parameter based upon the received eDDA assistance information of the UE. With the method according to the embodiments of the invention, when the UE is handed over from the source base station to the candidate target base station, the candidate target base station can obtain the eDDA assistance information of the UE and configure the UE with an appropriate radio resource parameter as soon as possible to thereby improve the performance of the system and lower an air interface signaling overhead.

Particularly the eDDA assistance information of the UE can include at least Power Preference Indicator (PPI) information and mobility information.

The PPI information can include indicators of a subscriber on a "default configuration" and a "power-saving configuration", both of which are applicable to all of parameter configurations, related to power consumption, with a DDX parameter as a delegate parameter.

The mobility information can include Mobility State Estimation (MSE) information of the UE and/or historical information of the UE (including the ID of a cell, periods of time for which the UE remains in an idle/connected state in the cell, etc.) and/or other available mobility related information (e.g., real mobility state information of the UE, e.g., a particular speed at which the UE moves).

The technical solutions according to the embodiments of the invention will be described below clearly and fully with reference to the drawings, and obviously the embodiments described below are merely some but not all of the embodiments of the invention. Based upon the embodiments here of the invention, the other embodiments which can occur to those skilled in the art will fall into the scope of the invention. For the sake of a convenient description, assistance information is eDDA assistance information unless otherwise indicated below.

First Embodiment

FIG. 1 illustrates a schematic flow chart of a method for transmitting information according to a first embodiment of the invention. As illustrated in FIG. 1, the method can include the following operations:

Operation 101: A source base station judges whether a UE needs to be handed over between base stations, and if so, then the flow proceeds to the operation 102; otherwise, the flow proceeds to the operation 101.

Particularly the source base station can judges whether the UE needs to be handed over between base stations according to a measurement result reported by the UE in a serving cell, and other information. If the source base station determines that the UE needs to be handed over between base stations, then the source base station further determines candidate target base station, so that the candidate target base station obtain assistance information of the UE as soon as possible to enable the candidate target base station configure the UE with an appropriate radio resource parameter.

Operation 102: When the source base station supports an eDDA assistance information reporting and processing capability, the source base station inquires about whether candidate target base station support the eDDA assistance information reporting and processing capability.

Operation 103: If the source base station determines as a result of an inquiry that the candidate target base station supports the eDDA assistance information reporting and processing capability or fails to inquire about whether the candidate target base station supports the eDDA assistance information reporting and processing capability, or the source base station does not inquire about whether the candidate target base station supports the eDDA assistance information reporting and processing capability, then the source base station transmits eDDA assistance information of the UE to the candidate target base station.

Particularly in the embodiment of the invention, the source base station transmits the assistance information of the UE to the candidate target base station in the following two scenarios:

In a first scenario, the source base station transmits the assistance information of the UE to candidate target base station supporting the eDDA assistance information reporting and processing capability.

Particularly in the embodiment of the invention, the source base station can transmit the assistance information of the UE to the candidate target base station supporting the eDDA assistance information reporting and processing capability in the following approaches:

1) The source base station determines from an eDDA capability support list stored by the source base station whether the candidate target base station support the eDDA assistance information reporting and processing capability.

Particularly as per the existing protocol, after a base station is powered on, the base station can obtain a list of neighboring cells through Automatic Neighbor Relationship (ANR) and other functions, for example, the base station can determine neighboring cells of the base station from a measurement report result of a UE served by the base station and then determine neighboring base stations according to the base station from home base stations of these cells.

After the neighboring base stations are determined, the base station can obtain information about whether the neighboring base stations support the eDDA assistance information reporting and processing capability.

Particularly the base station interact with the neighboring base station via an interface between the base station and the neighboring base station (e.g., an X2 interface, an S1 interface or another interface) about the information about whether the neighboring base station supports the eDDA assistance information reporting and processing capability.

Particularly the base station can transmit a message to the neighboring base station via the interface between the base station and the neighboring base station to inquire about whether the neighboring base station supports the eDDA assistance information reporting and processing capability and judge from a response message of the neighboring base station whether the neighboring base station supports the eDDA assistance information reporting and processing capability and further maintain the eDDA capability support list of the respective neighboring base stations; or the base station can transmit a message to an OAM entity to inquire about whether the neighboring base station supports the eDDA assistance information reporting and processing capability and judge from a response message of the OAM entity whether the neighboring base station supports the eDDA assistance information reporting and processing capability and further maintain the eDDA capability support list of the respective neighboring base stations.

Particularly the message transmitted by the base station to the neighboring base station to inquire about whether the neighboring base station supports the eDDA assistance information reporting and processing capability can carry an indicator of whether the base station supports the eDDA assistance information reporting and processing capability and/or an instruction to inquire about capability of the neighboring base station (to instruct the neighboring base station to respond with whether it supports the eDDA assistance information reporting and processing capability); and accordingly the response message of the neighboring base station can carry an indicator of whether the neighboring base station supports the eDDA assistance information reporting and processing capability, where the indicator can be represented in one bit, for example, the bit of 1 indicates a support, and the bit of 0 indicates no support.

Particularly the message transmitted by the base station to the OAM entity to inquire about whether the neighboring base station supports the eDDA assistance information reporting and processing capability can carry can carry an indicator of the base station inquiring about whether the neighboring base station supports the eDDA assistance information reporting and processing capability, and the identifier of the neighboring base station; and accordingly the response message of the OAM entity can carry an indicator of whether the neighboring base station supports the eDDA assistance information reporting and processing capability, and the identifier of the neighboring base station.

2) After the source base station determines that the UE needs to be handed over between base stations, the source base station inquires the candidate target base station or the OAM entity about whether the candidate target base station supports the eDDA assistance information reporting and processing capability.

Particularly after the source base station determines that the UE needs to be handed over between base stations, the source base station can inquire via an interface between the source base station and the candidate target base station (e.g., an X2 interface, an S1 interface or another interface) about whether the candidate target base station support the eDDA assistance information reporting and processing capability; or the source base station can transmit an inquiry message to an OAM entity to inquire about whether the candidate target base station supports the eDDA assistance information reporting and processing capability. The candidate target base station or the OAM entity notify the source base station about whether the candidate target base station support the eDDA assistance information reporting and processing capability upon reception of the inquiry message from the source base station.

Particularly the message transmitted by the source base station to the candidate target base station to inquire about whether the candidate target base station supports the eDDA assistance information reporting and processing capability can carry an indicator of the source base station inquiring the capability of whether the candidate target base station supports the eDDA assistance information reporting and processing capability and/or an indicator of whether the source base station supports the eDDA assistance information reporting and processing capability; and accordingly the response message of the candidate target base station can carry an indicator of whether the candidate target base station supports the eDDA assistance information reporting and processing capability, where the indicator of inquiring the capability transmitted by the source base station is represented in one bit, and if the 1-bit indicator of inquiring the capability occurs, then it indicates a request of the source base station to the candidate target base station for notifying whether they support the eDDA assistance information reporting and processing capability; otherwise, it indicates no inquiry of the source base station about whether the candidate target base station supports the eDDA assistance information reporting and processing capability; for example, the 1-bit indicator with the value of 1 indicates a request of the source base station to the candidate target base station for providing information about whether the candidate target base station supports the eDDA assistance information reporting and processing capability, and the indicator with the value of 0 indicates no inquiry of the source base station about whether the candidate target base station supports the eDDA assistance information reporting and processing capability. Alike the source base station can provide the candidate target base station with information about whether the source base station supports the eDDA assistance information reporting and processing capability, and the indicator can be represented in one bit, for example, the indicator with the value of 1 indicates a support by the source base station of the eDDA assistance information reporting and processing capability, and the indicator with the value of 0 indicates no support by the source base station of the eDDA assistance information reporting and processing capability.

Particularly the message transmitted by the source base station to the OAM entity to inquire about whether the candidate target base station supports the eDDA assistance information reporting and processing capability can carry an indicator of the source base station inquiring about whether the candidate target base station supports the eDDA assistance information reporting and processing capability, and the identifier of the candidate target base station; and accordingly the response message of the OAM entity can carry an indicator of whether the candidate target base station supports the eDDA assistance information reporting and processing capability, and the identifier of the candidate target base station.

In a second scenario, the source base station transmits the assistance information to all the candidate target base station.

Particularly in the embodiment of the invention, when the source base station has no knowledge of whether the candidate target base station support the eDDA assistance information reporting and processing capability, or the source base station takes into no account whether the candidate target base station support the eDDA assistance information reporting and processing capability (that is, the source base station transmits the assistance information directly to the candidate target base station no matter whether the candidate target base station support the eDDA assistance information reporting and processing capability), the source base station can transmit the assistance information of the UE to all the candidate target base station. Upon reception of the assistance information of the UE, if the candidate target base station does not support the eDDA assistance information reporting and processing capability, then it ignore the received assistance information; and if the target base station candidate supports the eDDA assistance information reporting and processing capability, then it configure the UE with a radio resource parameter according to the received assistance information.

Operation 104: When the candidate target base station supports the eDDA assistance information reporting and processing capability, the candidate target base station configures the UE with a radio resource parameter based upon the received assistance information of the UE.

Particularly the candidate target base station supporting the eDDA assistance information reporting and processing capability can further judge whether the present base stations support a handover of the UE thereto upon reception of the assistance information of the UE, and if so, then the candidate target base station configures the UE with a radio resource parameter and transmits the configured radio resource parameter to the source base station. The source base station selects one of all the candidate target base station as the final target base station and transmits the radio resource parameter corresponding to the selected candidate target base station to the UE in a handover command, the detailed implementation of which will not be repeated in the embodiments of the invention.

The technical solutions according to the embodiments of the invention will be described below more clearly and in further details with reference to particular application scenarios thereof.

Second Embodiment

In this embodiment, a base station A is a home base station of a serving cell of a UE (i.e., a source base station), and the base station A interacts with other base stations via interfaces between the base station A and the other base stations (e.g., an X2 interface) about information of whether they support an assistance information (e.g., PPI information) reporting and processing capability, the base station A supports the assistance information reporting and processing capability.

Figure 2:
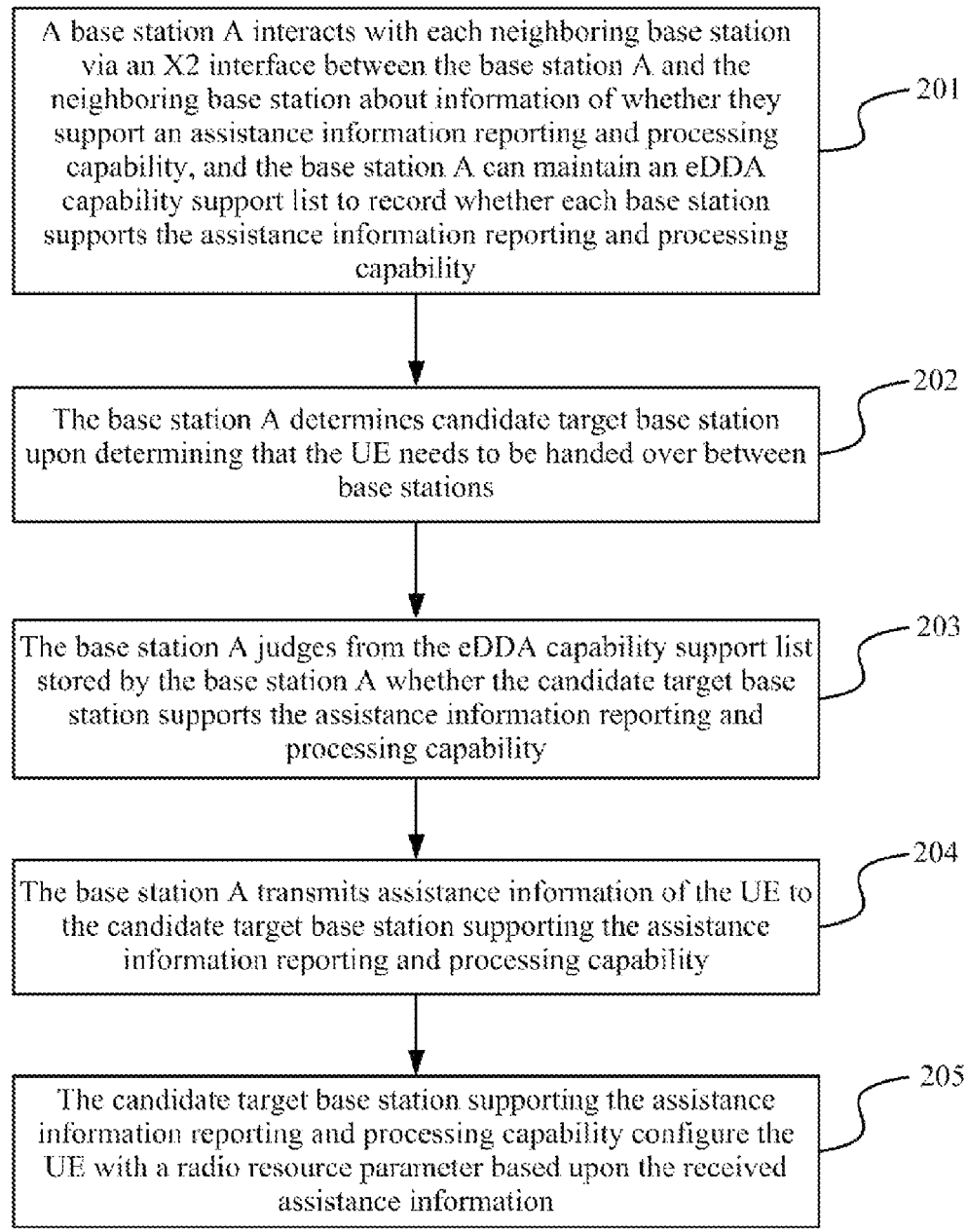
FIG. 2 illustrates a schematic flow chart of another method for transmitting information according to a second embodiment of the invention.

FIG. 2 illustrates a schematic flow chart of a method for transmitting information in a particular application scenario according to a second embodiment of the invention. As illustrated in FIG. 2, the method can include the following operations:

Operation 201: A base station A interacts with each neighboring base station via an X2 interface between the base station A and the neighboring base station about information of whether they support an assistance information reporting and processing capability, and furthermore the base station A can maintain an eDDA capability support list to record whether the each neighboring base station supports the assistance information reporting and processing capability.

Particularly in the embodiment, when the base station A takes into account whether the neighboring base stations support the assistance information reporting and processing capability, the base station A can determine neighboring cells of the base station from a measurement report result of a UE served by the base station and further determine the neighboring base stations to the base station A from home base stations of the respective neighboring cells. The base station A interacts with the neighboring base stations via an X2 interfaces between the base station A and the neighboring base stations about the information of whether they support a PPI information reporting and processing capability of the UE.

If the base station A being powered on determines the base station A to be neighboring to a base station B according to the measurement report result of the UE served by the base station A, then the base station A can initiate an X2 interface setup procedure to the base station B and interact with the base station B in the procedure about information whether they support the PPI information reporting and processing capability of the UE.

Particularly the base station A can notify the base station B of whether the base station A supports the PPI information reporting and processing capability of the UE in an X2 Setup Request message, for example, the base station A can add an indicator (the indicator can be represented in one bit, where the indicator with the value of 1 indicates a support by the base station A of the assistance information reporting and processing capability, and the indicator with the value of 0 indicates no support by the base station A of the assistance information reporting and processing capability) to the existing X2 Setup Request message and/or can carry an instruction to inquire about the capability of the neighboring base station in the X2 Setup Request message. Alike the base station B can respond to the X2 Setup Request message by providing the base station A with information about whether the base station B supports the PPI information reporting and processing capability of the UE, for example, the base station B can add an indicator (the indicator can be represented in one bit, where the indicator with the value of 1 indicates a support by the base station B of the assistance information reporting and processing capability, and the indicator with the value of 0 indicates no support by the base station B of the assistance information reporting and processing capability) in an X2 Setup Response message.

The base station A maintains a list to record whether the neighboring base stations support the assistance information reporting and processing capability of the UE, i.e., an eDDA capability support list, according to the received information provided by the neighboring base stations about whether they support the assistance information reporting and processing capability of the UE.

Operation 202: The base station A determines candidate target base station upon determining that the UE needs to be handed over between base stations.

Operation 203: The base station A judges from the eDDA capability support list stored by the base station A whether the candidate target base station supports the assistance information reporting and processing capability.

Operation 204: The base station A transmits assistance information of the UE to the candidate target base station supporting the assistance information reporting and processing capability.

Particularly the base station A can judge from the measurement result reported by the UE and other information whether to initiate a base station handover procedure. If the base station A takes into account whether the candidate target base station supports the assistance information reporting and processing capability and the base station A determines a handover procedure to be initiated, then the base station A can judge from the eDDA capability support list stored by the base station A whether the candidate target base station support the assistance information reporting and processing capability. When the base station A determines that the candidate target base station supports the capability, the base station A can transmit PPI information to the candidate target base station in a Handover Preparation message.

Particularly the base station A can add the PPI information to an existing Handover Preparation message Information Element (IE) or Access Stratum (AS)-Context IE or AS-Configuration IE or Radio Resource Management (RRM)-Configuration IE to transmit to the candidate target base station the latest PPI information reported previously by the UE to the base station A.

Particularly the base station A can alternatively transmit to the candidate target base station the PPI information reported by the UE only if the PPI information indicates low power. In this case, when both the source base station and the candidate target base station support the assistance information reporting and processing capability of the UE and the candidate target base station receive no PPI information transmitted by the source base station, the candidate target base station determine by default that the PPI information of the UE indicates default configuration.

Operation 205: The candidate target base station supporting the assistance information reporting and processing capability configure the UE with a radio resource parameter based upon the received assistance information.

Particularly the candidate target base station supporting the assistance information reporting and processing capability configure the UE with an appropriate radio resource parameter according to the received PPI information of the UE upon reception of the PPI information.

Particularly the candidate target base station can further notify the UE of the current configuration being a power-saving configuration or a default configuration. Moreover the candidate target base station can further notify the UE in the handover command that the present base station has obtained the assistance information of the UE and at this time does not require the assistance information to be reported again by the UE until new assistance information is further reported when there is a change in preference of a subscriber.

Third Embodiment

In this embodiment, a base station A is a home base station of a serving cell of a UE (i.e., a source base station), and when the base station A takes into account whether candidate target base station support an assistance information reporting and processing capability, the base station inquires an OAM entity about whether neighboring base station supports the assistance information (e.g., PPI information) reporting and processing capability, the base station A supports the assistance information reporting and processing capability.

Figure 3:
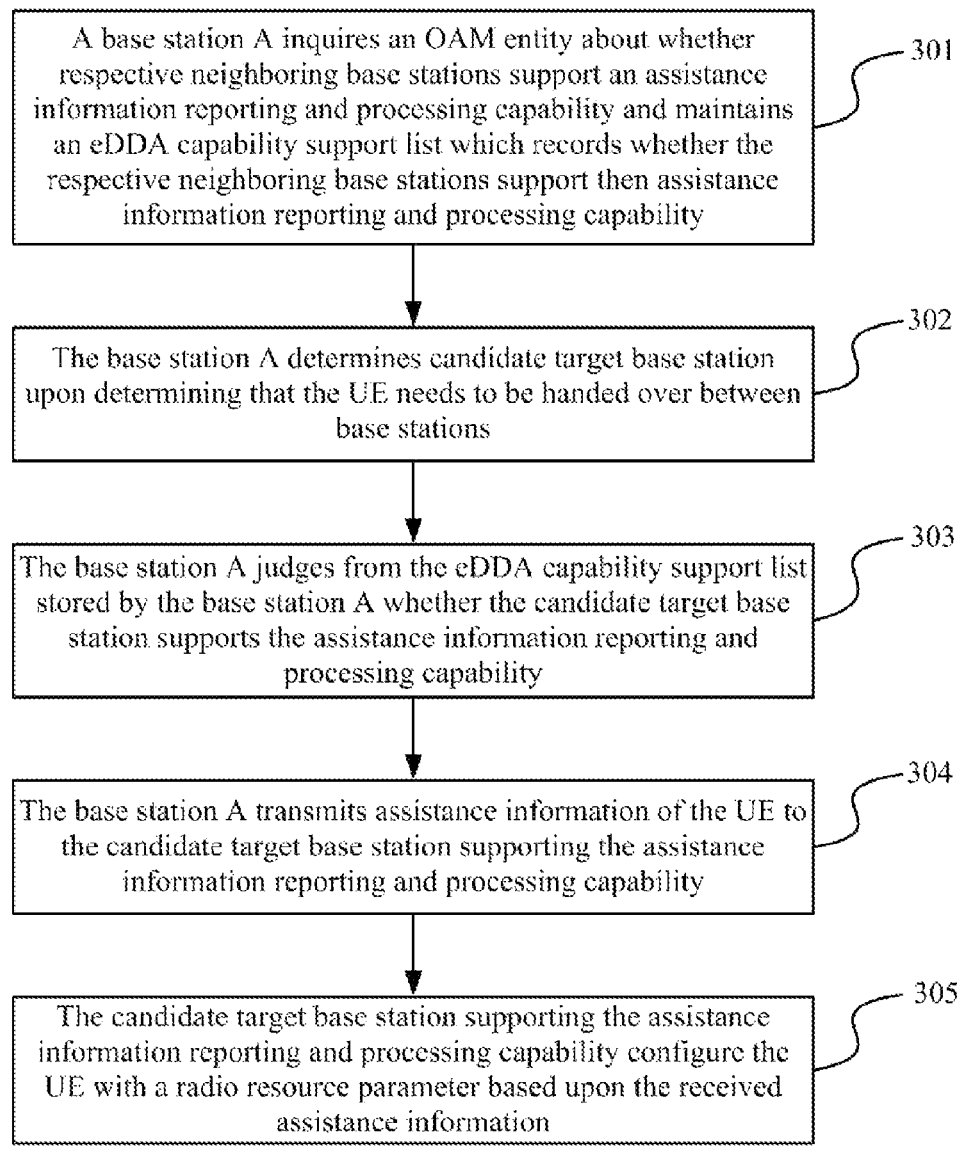
FIG. 3 illustrates a schematic flow chart of another method for transmitting information according to a third embodiment of the invention.

FIG. 3 illustrates a schematic flow chart of a method for transmitting information in another particular application scenario according to a third embodiment of the invention. As illustrated in FIG. 3, the method can include the following operations:

Operation 301: A base station A inquires an OAM entity about whether respective neighboring base stations support an assistance information reporting and processing capability and maintains an eDDA capability support list which records whether the respective neighboring base stations support the assistance information reporting and processing capability.

Particularly in the embodiment, when the base station A takes into account whether candidate target base station supports the assistance information reporting and processing capability and after the base station A determines its own neighboring base stations, the base station A inquires the OAM entity about whether the neighboring base station to the base station A supports the assistance information reporting and processing capability.

If the base station A being powered on determines the base station to be neighboring to a base station B according to a measurement report result of a UE served by the base station A, then the base station A can transmit a message to the OAM entity to inquire about whether the base station B supports the assistance information reporting and processing capability. The OAM entity notifies the base station A of an inquiry result.

The base station A maintains a list to record whether the neighboring base stations support the assistance information reporting and processing capability of the UE, i.e., an eDDA capability support list, according to the received information provided by the neighboring base stations about whether they support the assistance information reporting and processing capability of the UE.

Operation 302: The base station A determines candidate target base station upon determining that the UE needs to be handed over between base stations.

Operation 303: The base station A judges from the eDDA capability support list stored by the base station A whether the candidate target base station supports the assistance information reporting and processing capability.

Operation 304: The base station A transmits assistance information of the UE to the candidate target base station supporting the assistance information reporting and processing capability.

Operation 305: The candidate target base station supporting the assistance information reporting and processing capability configure the UE with a radio resource parameter based upon the received assistance information.

Forth Embodiment

In this embodiment, a base station A is a home base station of a serving cell of a UE (i.e., a source base station), and the base station A does not maintains an eDDA capability support list to indicate whether neighboring base stations support an assistance information (e.g., PPI information) reporting and processing capability, the base station A supports the assistance information reporting and processing capability.

Figure 4:
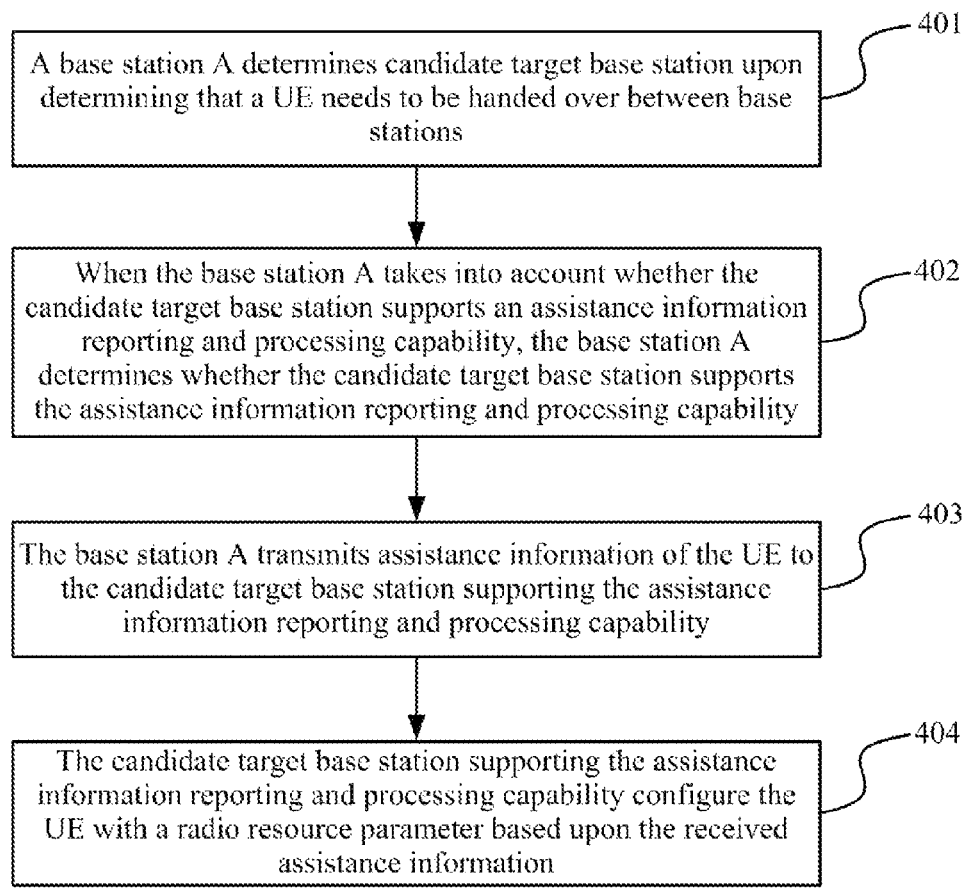
FIG. 4 illustrates a schematic flow chart of another method for transmitting information according to a fourth embodiment of the invention.

FIG. 4 illustrates a schematic flow chart of a method for transmitting information in another particular application scenario according to a fourth embodiment of the invention. As illustrated in FIG. 4, the method can include the following operations:

Operation 401: A base station A determines candidate target base station upon determining that a UE needs to be handed over between base stations.

Operation 402: When the base station A takes into account whether the candidate target base station supports an assistance information reporting and processing capability, the base station A determines whether the candidate target base station supports the assistance information reporting and processing capability.

Particularly in the embodiment, after the base station A determines that the UE needs to be handed over between base stations and determines the candidate target base station, the base station A can obtain information about whether the candidate target base station supports the assistance information reporting and processing capability via an interface between the base station and the candidate target base station or by inquiring an OAM entity about information about whether the candidate target base station supports the assistance information reporting and processing capability.

Operation 403: The base station A transmits assistance information of the UE to the candidate target base station supporting the assistance information reporting and processing capability.

Operation 404: The candidate target base station supporting the assistance information reporting and processing capability configure the UE with a radio resource parameter based upon the received assistance information.

Fifth Embodiment

In this embodiment, a base station A is a home base station of a serving cell of a UE (i.e., a source base station), the base station A supports an assistance information (e.g., PPI information) reporting and processing capability, and the base station A has no knowledge of whether other base stations support the assistance information reporting and processing capability, or the base station takes into no account whether candidate target base station support the assistance information reporting and processing capability (that is, the base station transmits assistance information directly to the candidate target base station no matter whether the candidate target base station support the eDDA assistance information reporting and processing capability).

Figure 5:
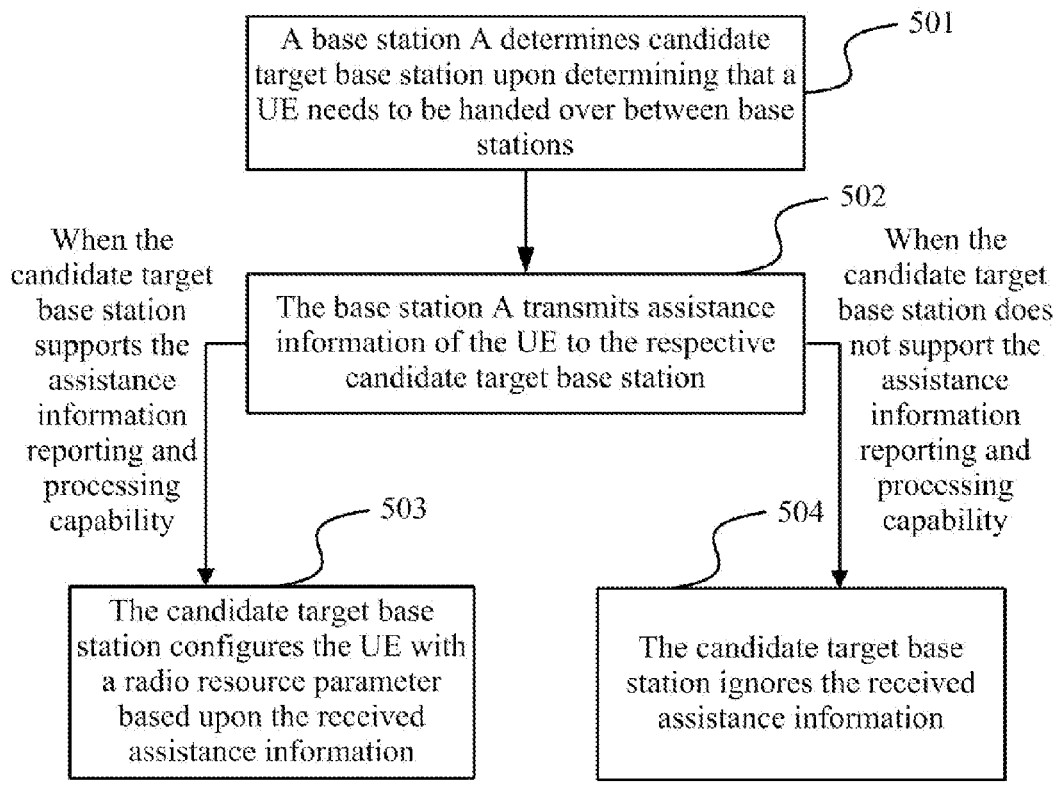
FIG. 5 illustrates a schematic flow chart of another a method for transmitting information according to a fifth embodiment of the invention.

FIG. 5 illustrates a schematic flow chart of a method for transmitting information in another particular application scenario according to a fifth embodiment of the invention. As illustrated in FIG. 5, the method can include the following operations:

Operation 501: A base station A determines candidate target base station upon determining that a UE needs to be handed over between base stations.

Operation 502: The base station A transmits assistance information of the UE to the respective candidate target base station.

Particularly in the embodiment, the base station A transmits PPI information of the UE to the respective determined candidate target base station upon determining that the UE needs to be handed over between base stations.

Operation 503: When the candidate target base station supports the assistance information reporting and processing capability, the candidate target base station configures the UE with a radio resource parameter based upon the received assistance information.

Operation 504: When the candidate target base station does not support the assistance information reporting and processing capability, the candidate target base station ignores the received assistance information.

It shall be noted that in the embodiments of the invention, when the source base station does not support the assistance information reporting and processing capability, the source base station will not transmit assistance information of the UE upon determining that a handover procedure needs to be initiated. In this case, the candidate target base station supporting the assistance information reporting and processing capability will notify the UE in the handover command to report assistance information and configure the UE with a radio resource parameter according to the received assistance information.

Based upon the same inventive idea as the method embodiments of the invention above, an embodiment of the invention further provides a base station applicable to the flow of the method above.

Sixth Embodiment

Figure 6:
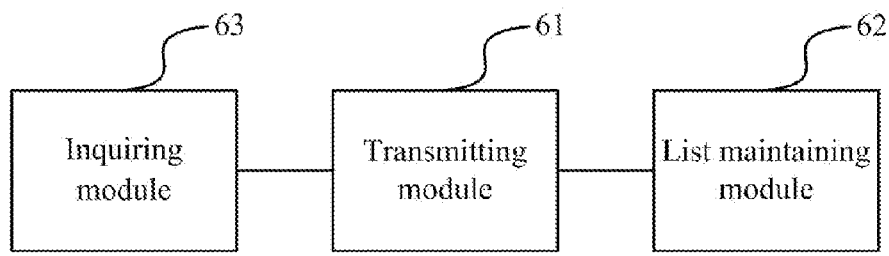
FIG. 6 illustrates a schematic structural diagram of a base station according to a sixth embodiment of the invention.

FIG. 6 illustrates a schematic structural diagram of a base station according to a sixth embodiment of the invention. As illustrated in FIG. 6, the base station can include:

An inquiring module 61 is configured, when the base station supports an Enhancements for Diverse Data Applications (eDDA) assistance information reporting and processing capability and the base station determines that a User Equipment (UE) needs to be handed over between base stations, to inquire about whether candidate target base station supports the eDDA assistance information reporting and processing capability; and A transmitting module 62 is configured, when the inquiring module 61 determines as a result of an inquiry that the candidate target base station supports the eDDA assistance information reporting and processing capability, or fails to inquire about whether the candidate target base station supports the eDDA assistance information reporting and processing capability, or does not inquire about whether the candidate target base station supports the eDDA assistance information reporting and processing capability, to transmit eDDA assistance information of the UE to the candidate target base station so that the candidate target base station supporting the eDDA assistance information reporting and processing capability configure the UE with a radio resource parameter based upon the received eDDA assistance information of the UE.

Particularly the inquiring module 61 can be configured:

To inquire an eDDA capability support list stored by the base station about whether the candidate target base station supports the eDDA assistance information reporting and processing capability, where the eDDA capability support list stored by the base station records whether neighboring base stations to the base station support the eDDA assistance information reporting and processing capability; or To transmit a message to the candidate target base station via an interface between the base station and the candidate target base station to inquire about whether the candidate target base station supports the eDDA assistance information reporting and processing capability, and to judge from a response message of the candidate target base station whether the candidate target base station supports the eDDA assistance information reporting and processing capability; or To transmit a message to an Operation and Maintenance (OAM) entity to inquire about whether the candidate target base station supports the eDDA assistance information reporting and processing capability, and to judge from a response message of the OAM entity whether the candidate target base station supports the eDDA assistance information reporting and processing capability.

Particularly the base station according to the embodiment of the invention further includes a list maintaining module 63, configured to obtain the eDDA capability support list, being configured:

When the base station is initialized, to determine the neighboring base stations to the base station, to transmit a message to the neighboring base station via an interface between the base station and the neighboring base station to inquire about the neighboring base station supports the eDDA assistance information reporting and processing capability, to judge from a response message of the neighboring base station whether the neighboring base station supports the eDDA assistance information reporting and processing capability, and to maintain the eDDA capability support list; or When the base station is initialized, to determine the neighboring base stations to the base station, to transmit a message to the OAM entity to inquire about whether the neighboring base station supports the eDDA assistance information reporting and processing capability, to judge from a response message of the OAM entity whether the neighboring base station supports the eDDA assistance information reporting and processing capability, and to maintain the eDDA capability support list.

Particularly the message transmitted by the inquiring module 61 to the candidate target base station via the interface between the base station and the candidate target base station to inquire about whether the candidate target base station supports the eDDA assistance information reporting and processing capability carries an instruction to inquire about the capability of the candidate target base station and/or an indicator to indicate whether the base station supports the eDDA assistance information reporting and processing capability, where the instruction to inquire about the capability of the target base station candidate instructs the candidate target base station to respond with whether it supports the eDDA assistance information reporting and processing capability;

The response message of the candidate target base station received by the inquiring module 61 carries an indicator to indicate whether the candidate target base station supports the eDDA assistance information reporting and processing capability;

The message transmitted by the inquiring module 61 to the OAM entity to inquire about whether the candidate target base station supports the eDDA assistance information reporting and processing capability carries an indicator to inquire whether the candidate target base station supports the eDDA assistance information reporting and processing capability, and the identifier of the candidate target base station;

The response message of the OAM entity received by the inquiring module 61 carries an indicator to indicate whether the candidate target base station supports the eDDA assistance information reporting and processing capability, and the identifier of the candidate target base station;

The message transmitted by the list maintaining module 63 to the neighboring base station via the interface between the base station and the neighboring base station to inquire about whether the neighboring base station supports the eDDA assistance information reporting and processing capability carries an instruction to inquire about the capability of the neighboring base station and an indicator to indicate whether the base station supports the eDDA assistance information reporting and processing capability, or only the indicator to indicate whether the base station supports the eDDA assistance information reporting and processing capability;

The response message of the neighboring base station received by the list maintaining module 63 carries an indicator to indicate whether the neighboring base station supports the eDDA assistance information reporting and processing capability;

The message transmitted by the list maintaining module 63 to the OAM entity to inquire about whether the neighboring base station supports the eDDA assistance information reporting and processing capability carries an indicator to inquire about whether the neighboring base station supports the eDDA assistance information reporting and processing capability, and the identifier of the neighboring base station; and The response message of the OAM entity received by the list maintaining module 63 carries an indicator to indicate whether the neighboring base station supports the eDDA assistance information reporting and processing capability, and the identifier of the neighboring base station.

Particularly the interface between the base station and the candidate target base station or the neighboring base station is an X2 interface or an S1 interface.

Particularly when the interface between the base station and the neighboring base station is an X2 interface, The list maintaining module 63 can be configured to transmit to the neighboring base station to the base station an X2 Setup Request message carrying an indicator to indicate whether the base station supports the eDDA assistance information reporting and processing capability and to request the neighboring base station for responding with whether they support the eDDA assistance information reporting and processing capability, or to indicate whether the base station supports the eDDA assistance information reporting and processing capability; and to receive an X2 Setup Response message, returned by the neighboring base station to the base station, carrying an indicator to indicate whether the neighboring base station supports the eDDA assistance information reporting and processing capability.

Particularly when the source base station does not support the eDDA assistance information reporting and processing capability, but the candidate target base station supports the eDDA assistance information reporting and processing capability, the candidate target base station transmits an instruction message to the UE to instruct the UE to report the eDDA assistance information to the candidate target base station.

Particularly the eDDA assistance information includes Power Preference Indicator (PPI) information and/or mobility information; and The PPI information indicates that a radio resource parameter desirable to the UE is a default configuration or a power-saving configuration, and The mobility information includes mobility state estimation information of the UE and/or the ID of a serving cell of the UE, and periods of time for which the UE remains in an idle/connected state in the serving cell and/or real mobility state information of the UE.

Those skilled in the art can clearly appreciate from the foregoing description of the embodiments that the embodiments of the invention can be implemented in software plus a necessary general hardware platform or, of course, in hardware, although the former implementation is preferred in many cases. Based upon such understanding, the technical solutions of the embodiments of the invention in essence or the part thereof contributing to the prior art can be embodied in the form of a software product which can be stored in a storage medium and which includes several instructions to cause a terminal device (e.g., a mobile phone, a personal computer, a server, a network device, etc.) to perform the methods according to the respective embodiments of the invention.

The foregoing disclosure is merely illustrative of the preferred embodiments of the invention, and it shall be noted that those ordinarily skilled in the art can further make several modifications and variations without departing from the principle of the embodiments of the invention and that these modifications and variations shall also be construed as falling into the scope of the invention.

The invention claimed is:

1. A method for transmitting information, wherein the method comprises:
   when a source base station supporting an Enhancements for Diverse Data Applications, eDDA, assistance information reporting and processing capability determines that a User Equipment, UE, needs to be handed over between base stations, inquiring about whether a candidate target base station supports the eDDA assistance information reporting and processing capability; and
   if the source base station determines as a result of an inquiry that the candidate target base station supports the eDDA assistance information reporting and processing capability, or fails to inquire about whether the candidate target base station supports the eDDA assistance information reporting and processing capability, then transmitting, by the source base station, eDDA assistance information of the UE to the candidate target base station so that the candidate target base station supporting the eDDA assistance information reporting and processing capability configures the UE with a radio resource parameter based upon the received eDDA assistance information of the UE;
   wherein the eDDA assistance information comprises Power Preference Indicator, PPI, information and/or mobility information;
   the PPI information indicates that a radio resource parameter desirable to the UE is a default configuration or a power-saving configuration, and
   the mobility information comprises mobility state estimation information of the UE and/or an ID of a serving cell of the UE, and periods of time for which the UE remains in an idle/connected state in the serving cell and/or real mobility state information of the UE.

2. The method according to claim 1, wherein inquiring, by the source base station, about whether candidate target base station supports the eDDA assistance information reporting and processing capability comprises:
   inquiring, by the source base station, an eDDA capability support list stored by the source base station about whether candidate target base station supports the eDDA assistance information reporting and processing capability, wherein the eDDA capability support list stored by the source base station records whether a neighboring base station of the source base station supports the eDDA assistance information reporting and processing capability; or
   transmitting, by the source base station, a message to the candidate target base station via an interface between the source base station and the candidate target base station to inquire about whether the candidate target base station supports the eDDA assistance information reporting and processing capability, and judging from a response message of the candidate target base station whether the candidate target base station supports the eDDA assistance information reporting and processing capability; or
   transmitting, by the source base station, a message to an Operation and Maintenance, OAM, entity to inquire about whether the candidate target base station supports the eDDA assistance information reporting and processing capability, and judging from a response message of the OAM entity whether the candidate target base station supports the eDDA assistance information reporting and processing capability.

3. The method according to claim 2, wherein the eDDA capability support list is obtained in the following approaches:
   when the source base station is initialized, the source base station determines the neighboring base station thereof, transmits a message to the neighboring base station via an interface between the source base station and the neighboring base station to inquire about whether the neighboring base station supports the eDDA assistance information reporting and processing capability, judges from a response message of the neighboring base station whether the neighboring base station support the eDDA assistance information reporting and processing capability, and maintains the eDDA capability support list; or when the source base station is initialized, the source base station determines the neighboring base station thereof, transmits a message to the OAM entity to inquire about whether the neighboring base station supports the eDDA assistance information reporting and processing capability, judges from a response message of the OAM entity whether the neighboring base station supports the eDDA assistance information reporting and processing capability, and maintains the eDDA capability support list.

4. The method according to claim 2, wherein:

the message transmitted by the source base station to the candidate target base station via the interface between the source base station and the candidate target base station to inquire about whether the candidate target base station supports the eDDA assistance information reporting and processing capability carries an instruction to inquire about capability of the candidate target base station and/or an indicator to indicate whether the source base station supports the eDDA assistance information reporting and processing capability, wherein the instruction to inquire capability of the target base station candidate instructs the candidate target base station to respond with whether it supports the eDDA assistance information reporting and processing capability;

the response message of the candidate target base station received by the source base station carries an indicator to indicate whether the candidate target base station supports the eDDA assistance information reporting and processing capability;

the message transmitted by the source base station to the OAM entity to inquire about whether the candidate target base station supports the eDDA assistance information reporting and processing capability carries an indicator to inquire about whether the candidate target base station supports the eDDA assistance information reporting and processing capability, and identifier of the candidate target base station;

the response message of the OAM entity received by the source base station carries an indicator to indicate whether the candidate target base station supports the eDDA assistance information reporting and processing capability, and the identifier of the candidate target base station;

the message transmitted by the source base station to the neighboring base station via the interface between the source base station and the neighboring base station to inquire about whether the neighboring base station supports the eDDA assistance information reporting and processing capability carries an instruction to inquire about capability of the neighboring base station and an indicator to indicate whether the source base station supports the eDDA assistance information reporting and processing capability, or only the indicator to indicate whether the source base station supports the eDDA assistance information reporting and processing capability;

the response message of the neighboring base station received by the source base station carries an indicator to indicate whether the neighboring base station supports the eDDA assistance information reporting and processing capability;

the message transmitted by the source base station to the OAM entity to inquire about whether the neighboring base station supports the eDDA assistance information reporting and processing capability carries an indicator to inquire about whether the neighboring base station supports the eDDA assistance information reporting and processing capability, and identifier of the neighboring base station; and the response message of the OAM entity received by the source base station carries an indicator to indicate whether the neighboring base station supports the eDDA assistance information reporting and processing capability, and the identifier of the neighboring base station.

5. The method according to claim 2, wherein the interface between the source base station and the candidate target base station or the neighboring base station is an X2 interface or an S1 interface.

6. The method according to claim 5, wherein when the interface between the source base station and the neighboring base station is an X2 interface, the message transmitted by the source base station to the neighboring base station to inquire about whether the neighboring base station supports the eDDA assistance information reporting and processing capability is:

an X2 Setup Request message carrying an indicator to indicate whether the source base station supports the eDDA assistance information reporting and processing capability and to request the neighboring base station for responding with whether it supports the eDDA assistance information reporting and processing capability, or to indicate whether the base station supports the eDDA assistance information reporting and processing capability; and the response message of the neighboring base station received by the source base station is:

an X2 Setup Response message carrying an indicator to indicate whether the neighboring base station supports the eDDA assistance information reporting and processing capability.

7. The method according to claim 3, wherein:

the message transmitted by the source base station to the candidate target base station via the interface between the source base station and the candidate target base station to inquire about whether the candidate target base station supports the eDDA assistance information reporting and processing capability carries an instruction to inquire about capability of the candidate target base station and/or an indicator to indicate whether the source base station supports the eDDA assistance information reporting and processing capability, wherein the instruction to inquire capability of the target base station candidate instructs the candidate target base station to respond with whether it supports the eDDA assistance information reporting and processing capability;

the response message of the candidate target base station received by the source base station carries an indicator to indicate whether the candidate target base station supports the eDDA assistance information reporting and processing capability;

the message transmitted by the source base station to the OAM entity to inquire about whether the candidate target base station supports the eDDA assistance information reporting and processing capability carries an indicator to inquire about whether the candidate target base station supports the eDDA assistance information reporting and processing capability, and identifier of the candidate target base station;

the response message of the OAM entity received by the source base station carries an indicator to indicate whether the candidate target base station supports the eDDA assistance information reporting and processing capability, and the identifier of the candidate target base station;

the message transmitted by the source base station to the neighboring base station via the interface between the source base station and the neighboring base station to inquire about whether the neighboring base station supports the eDDA assistance information reporting and processing capability carries an instruction to inquire about capability of the neighboring base station and an indicator to indicate whether the source base station supports the eDDA assistance information reporting and processing capability, or only the indicator to indicate whether the source base station supports the eDDA assistance information reporting and processing capability;

the response message of the neighboring base station received by the source base station carries an indicator to indicate whether the neighboring base station supports the eDDA assistance information reporting and processing capability;

the message transmitted by the source base station to the OAM entity to inquire about whether the neighboring base station supports the eDDA assistance information reporting and processing capability carries an indicator to inquire about whether the neighboring base station supports the eDDA assistance information reporting and processing capability, and identifier of the neighboring base station; and the response message of the OAM entity received by the source base station carries an indicator to indicate whether the neighboring base station supports the eDDA assistance information reporting and processing capability, and the identifier of the neighboring base station.

8. The method according to claim 2, wherein the eDDA assistance information comprises Power Preference Indicator, PPI, information and/or mobility information;

the PPI information indicates that a radio resource parameter desirable to the UE is a default configuration or a power-saving configuration, and the mobility information comprises mobility state estimation information of the UE and/or an ID of a serving cell of the UE, and periods of time for which the UE remains in an idle/connected state in the serving cell and/or real mobility state information of the UE.

9. The method according to claim 1, wherein the method further comprises:

when the source base station does not support the eDDA assistance information reporting and processing capability, but the candidate target base station supports the eDDA assistance information reporting and processing capability, transmitting, by the candidate target base station, an instruction message to the UE to instruct the UE to report the eDDA assistance information to the candidate target base station.

10. A base station, wherein the base station comprises:

a circuitry configured to implement an inquiring module and a transmitting module, the inquiring module configured, when the base station supports an Enhancements for Diverse Data Applications, eDDA, assistance information reporting and processing capability and the base station determines a User Equipment, UE, needs to be handed over between base stations, to inquire about whether candidate target base station support the eDDA assistance information reporting and processing capability; and the transmitting module configured, when the inquiring module determines as a result of an inquiry that the candidate target base station supports the eDDA assistance information reporting and processing capability, or fails to inquire about whether the candidate target base station supports the eDDA assistance information reporting and processing capability, to transmit eDDA assistance information of the UE to the candidate target base station so that the candidate target base station supporting the eDDA assistance information reporting and processing capability configures the UE with a radio resource parameter based upon the received eDDA assistance information of the UE;

wherein the eDDA assistance information comprises Power Preference Indicator (PPI) information and/or mobility information; and the PPI information indicates that a radio resource parameter desirable to the UE is a default configuration or a power-saving configuration, and the mobility information comprises mobility state estimation information of the UE and/or an ID of a serving cell of the UE, and a period of time for which the UE remains in an idle/connected state in the serving cell and/or real mobility state information of the UE.

11. The base station according to claim 10, wherein the inquiring module can be configured:

to inquire an eDDA capability support list stored by the base station about whether the candidate target base station supports the eDDA assistance information reporting and processing capability, wherein the eDDA capability support list stored by the base station records whether neighboring base station of the base station supports the eDDA assistance information reporting and processing capability; or to transmit a message to the candidate target base station via an interface between the base station and the candidate target base station to inquire about whether the candidate target base station supports the eDDA assistance information reporting and processing capability, and to judge from a response message of the candidate target base station whether the candidate target base station support the eDDA assistance information reporting and processing capability; or to transmit a message to an Operation and Maintenance, OAM, entity to inquire about whether the candidate target base station supports the eDDA assistance information reporting and processing capability, and to judge from a response message of the OAM entity whether the candidate target base station supports the eDDA assistance information reporting and processing capability.

12. The base station according to claim 11, wherein the circuitry is further configured to implement a list maintaining module, configured to obtain the eDDA capability support list, being configured:

when the base station is initialized, to determine the neighboring base station of the base station, to transmit a message to the neighboring base station via an interface between the base station and the neighboring base station to inquire about the neighboring base station supports the eDDA assistance information reporting and processing capability, to judge from a response message of the neighboring base station whether the neighboring base station supports the eDDA assistance information reporting and processing capability, and to maintain the eDDA capability support list; or when the base station is initialized, to determine the neighboring base station to the base station, to transmit a message to the OAM entity to inquire about the neighboring base station support the eDDA assistance information reporting and processing capability, to judge from a response message of the OAM entity whether the neighboring base station supports the eDDA assistance information reporting and processing capability, and to maintain the eDDA capability support list.

13. The base station according to claim 11, wherein:

the message transmitted by the inquiring module to the candidate target base station via the interface between the base station and the candidate target base station to inquire about whether the candidate target base station supports the eDDA assistance information reporting and processing capability carries an instruction to inquire about capability of the candidate target base station and/or an indicator to indicate whether the base station supports the eDDA assistance information reporting and processing capability, wherein the instruction to inquire capability of the target base station candidate instructs the candidate target base station to respond with whether they support the eDDA assistance information reporting and processing capability;

the response message of the candidate target base station received by the inquiring module carries an indicator to indicate whether the candidate target base station supports the eDDA assistance information reporting and processing capability;

the message transmitted by the inquiring module to the OAM entity to inquire about whether the candidate target base station supports the eDDA assistance information reporting and processing capability carries an indicator to inquire about whether the candidate target base station supports the eDDA assistance information reporting and processing capability, and identifier of the candidate target base station;

the response message of the OAM entity received by the inquiring module carries an indicator to indicate whether the candidate target base station supports the eDDA assistance information reporting and processing capability, and the identifier of the candidate target base station;

the message transmitted by the list maintaining module to the neighboring base station via the interface between the base station and the neighboring base station to inquire about whether the neighboring base station supports the eDDA assistance information reporting and processing capability carries an instruction to inquire capability of the neighboring base station and an indicator to indicate whether the base station supports the eDDA assistance information reporting and processing capability, or only the indicator to indicate whether the base station supports the eDDA assistance information reporting and processing capability;

the response message of the neighboring base station received by the list maintaining module carries an indicator to indicate whether the neighboring base station supports the eDDA assistance information reporting and processing capability;

the message transmitted by the list maintaining module to the OAM entity to inquire about whether the neighboring base station supports the eDDA assistance information reporting and processing capability carries an indicator to inquire about whether the neighboring base station to support the eDDA assistance information reporting and processing capability, and identifier of the neighboring base station; and the response message of the OAM entity received by the list maintaining module carries an indicator to indicate whether the neighboring base station supports the eDDA assistance information reporting and processing capability, and the identifier of the neighboring base station.

14. The base station according to claim 11, wherein the interface between the base station and the candidate target base station or the neighboring base station is an X2 interface or an S1 interface.

15. The base station according to claim 14, wherein when the interface between the base station and the neighboring base station is an X2 interface, the list maintaining module is configured to transmit to the neighboring base station of the base station an X2 Setup Request message carrying an indicator to indicate whether the base station supports the eDDA assistance information reporting and processing capability and to request the neighboring base station for responding with whether it supports the eDDA assistance information reporting and processing capability, or to indicate whether the base station supports the eDDA assistance information reporting and processing capability; and to receive an X2 Setup Response message, returned by the neighboring base station of the base station, carrying an indicator to indicate whether the neighboring base station supports the eDDA assistance information reporting and processing capability.

16. The base station according to claim 12, wherein:

the message transmitted by the inquiring module to the candidate target base station via the interface between the base station and the candidate target base station to inquire about whether the candidate target base station supports the eDDA assistance information reporting and processing capability carries an instruction to inquire about capability of the candidate target base station and/or an indicator to indicate whether the base station supports the eDDA assistance information reporting and processing capability, wherein the instruction to inquire capability of the target base station candidate instructs the candidate target base station to respond with whether they support the eDDA assistance information reporting and processing capability;

the response message of the candidate target base station received by the inquiring module carries an indicator to indicate whether the candidate target base station supports the eDDA assistance information reporting and processing capability;

the message transmitted by the inquiring module to the OAM entity to inquire about whether the candidate target base station supports the eDDA assistance information reporting and processing capability carries an indicator to inquire about whether the candidate target base station supports the eDDA assistance information reporting and processing capability, and identifier of the candidate target base station;

the response message of the OAM entity received by the inquiring module carries an indicator to indicate whether the candidate target base station supports the eDDA assistance information reporting and processing capability, and the identifier of the candidate target base station;

the message transmitted by the list maintaining module to the neighboring base station via the interface between the base station and the neighboring base station to inquire about whether the neighboring base station supports the eDDA assistance information reporting and processing capability carries an instruction to inquire capability of the neighboring base station and an indicator to indicate whether the base station supports the eDDA assistance information reporting and processing capability, or only the indicator to indicate whether the base station supports the eDDA assistance information reporting and processing capability;

the response message of the neighboring base station received by the list maintaining module carries an indicator to indicate whether the neighboring base station supports the eDDA assistance information reporting and processing capability;

the message transmitted by the list maintaining module to the OAM entity to inquire about whether the neighboring base station supports the eDDA assistance information reporting and processing capability carries an indicator to inquire about whether the neighboring base station to support the eDDA assistance information reporting and processing capability, and identifier of the neighboring base station; and the response message of the OAM entity received by the list maintaining module carries an indicator to indicate whether the neighboring base station supports the eDDA assistance information reporting and processing capability, and the identifier of the neighboring base station.

17. The base station according to claim 11, wherein the eDDA assistance information comprises Power Preference Indicator (PPI) information and/or mobility information; and the PPI information indicates that a radio resource parameter desirable to the UE is a default configuration or a power-saving configuration, and the mobility information comprises mobility state estimation information of the UE and/or an ID of a serving cell of the UE, and a period of time for which the UE remains in an idle/connected state in the serving cell and/or real mobility state information of the UE.

18. The base station according to claim 10, wherein when the source base station does not support the eDDA assistance information reporting and processing capability, but the candidate target base station supports the eDDA assistance information reporting and processing capability, the candidate target base station transmits an instruction message to the UE to instruct the UE to report the eDDA assistance information to the candidate target base station.

* * * * *